(12) United States Patent
Rebouillat

(10) Patent No.: US 6,358,451 B1
(45) Date of Patent: Mar. 19, 2002

(54) GRAFTED POLY (P-PHENYLENE TEREPHTHALAMIDE) FIBERS

(75) Inventor: Serge Rebouillat, Echenevex (FR)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 09/483,547

(22) Filed: Jan. 14, 2000

Related U.S. Application Data

(62) Division of application No. 09/169,349, filed on Oct. 9, 1998, now Pat. No. 0,045,907.

(51) Int. Cl.⁷ ................................................ D01D 5/08
(52) U.S. Cl. .................... 264/178 R; 525/63; 8/115.56; 8/115.62; 8/115.65
(58) Field of Search .................. 525/63; 264/178 R, 264/184; 8/115.56, 115.62, 115.65

(56) References Cited

U.S. PATENT DOCUMENTS

| 4,889,579 A | 12/1989 | Burch | 156/305 |
| 5,310,824 A | 5/1994 | Burch et al. | 525/420 |
| 5,506,320 A * | 4/1996 | Yu | 526/266 |
| 5,512,630 A * | 4/1996 | Gagne et al. | 525/50 |

FOREIGN PATENT DOCUMENTS

| JP | 62-81426 | 4/1987 |
| JP | 62-91542 | 4/1987 |

OTHER PUBLICATIONS

Takayanagi et al., CAPLUS AN 1984:631373 1984.*
O'Connor, CAPLUS AN 1978:137670 1978.*
Robert R. Burch, Wilfred Sweeny, Hans–Werner Schmidt, and Young H. Kim, Preparation of Aromatic Polyamide Polyanions: A Novel Processing Strategy for Aromatic Polyamides, *Macromolecules/American Chemical Society*, 23, No. 4, pp. 1065–1072, 1990.
V. Ravichandran and S. K. Obendorf, Wettability and adhesion studies of grafted poly(p–phenylene terephthalamide) fiber surfaces, *J. Adhesion Sci. Technol.*, 6, No. 12, pp. 1303–1323, 1992.

* cited by examiner

*Primary Examiner*—Jeffrey Mullis

(57) ABSTRACT

Poly(p-phenylene terephthalamide) fibers are disclosed which have been grafted with nitrobenzyl, allyl, or nitrostilbene groups to increase adhesion of the fibers to rubber. A process for making the grafted fibers is, also, disclosed.

9 Claims, No Drawings

GRAFTED POLY (P-PHENYLENE TEREPHTHALAMIDE) FIBERS

This is a division of application Ser. No. 09/169,349 filed Oct. 9, 1998, now U.S. Pat. No. 6,045,907.

BACKGROUND OF THE INVENTION

1. Field of the Invention

This invention relates to grafted aramid fibers for improvement of adhesion between the fibers and rubber matrixes which the fibers are to reinforce. The aramid fibers are subjected to grafting while still containing water from the fiber manufacture.

2. Description of the Prior Art

U.S. Pat. No. 5,310,824, issued May 10, 1994, discloses poly(p-phenylene terephthalamide) fibers with fluoroalkyl groups grafted thereto and a process for performing the grafting reaction. The fibers are dry and there is no water in the grafting system.

Japanese Pat. Publication (Kokai) 62-81426 published Apr. 14, 1987 and Japanese Pat. Publication (Kokai) 62-91542, published Apr. 27, 1987 published Apr. 14, 1987, disclose a surface treatment of aramid by grafting reactions. The aramid can be poly(p-phenylene terephthalamide) fibers; but the reactions are anhydrous and dried fibers are used.

An article in The Journal of Adhesion Science, Volume 6, No. 12, pp. 1303–1323 (1992), titled "Wettability And Adhesion Studies Of Grafted Poly(P-Phenylene Terephthalamide) Fiber Surfaces", by Ravichandran and Obendorf, discloses that increased fiber-to-matrix adhesion can be obtained by grafting various materials onto the surface of fibers. The fibers are dry and the grafting reactions are free from water.

SUMMARY OF THE INVENTION

This invention relates to a fiber of poly(p-phenylene terephthalamide) having nitrobenzyl groups or nitrostilbene groups grafted thereto. It also relates to a fiber reinforced rubber composition comprising a rubber matrix material with, embedded therein, fibers of poly(p-phenylene terephthalamide) having nitrobenzyl, allyl, or nitrostilbene groups grafted thereto. There is, also, a process for making grafted poly(p-phenylene terephthalamide) fibers comprising the steps of: spinning a solution of poly(p-phenylene terephthalamide) into an aqueous coagulating bath to make coagulated fibers having 20% to 400% water, based on the weight of poly(p-phenylene terephthalamide) material in the fibers; contacting the coagulated fibers, along with the water therein, with a solution of strong base to make base-activated fibers; optionally, quenching the fibers with a nonaqueous solvent to remove any excess base; and contacting the base-activated fibers with a grafting solution of allyl halide, nitrobenzyl halide, or nitrostilbene halide grafting agents. The grafted fibers can be washed with water. Strong bases are those which exhibit a Pka greater than 12 in dimethyl sulfoxide. Potassium tert-butoxide is preferred.

DETAILED DESCRIPTION

Due to high strength and modulus, poly(p-phenylene terephthalamide) (PPD-T) fibers are particularly useful as a reinforcement for rubber. One troublesome aspect of the use of PPD-T fibers as a rubber reinforcement has, in the past, been a lack of good adhesion between the rubber matrix and the PPD-T fibers which reinforce it.

In the past, PPD-T fibers have been coated by two materials, individually, to achieve acceptable rubber adhesion properties. The fibers were treated by a complicated process—first, by an epoxy subcoating and, after drying and curing the subcoating, next by a resorcinol-formaldehyde topcoating which must, also, be dried and cured.

The inventor herein has found a treatment means for the PPD-T which requires only a single step and which can be conducted on the PPD-T fibers in a wet or never-dried state. The treatment of this invention can, thus, be conducted on PPD-T fibers on a continuous basis as an additional step in the fiber spinning process. This not only provides fibers of improved rubber adhesion, it provides these fibers by a considerably simplified process as a part of the fiber manufacture.

By PPD-T is meant the homopolymer resulting from mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. As a general rule, other diamines and other diacid chlorides can be used in amounts up to as much as about 10 mole percent of the p-phenylene diamine or the terephthaloyl chloride, or perhaps slightly higher, provided only that the other diamines and diacid chlorides have no reactive groups which interfere with the polymerization reaction. PPD-T, also, means copolymers resulting from incorporation of other aromatic diamines and other aromatic diacid chlorides such as, for example, 2,6-naphthaloyl chloride or chloro- or dichloroterephthaloyl chloride; provided, only that the other aromatic diamines and aromatic diacid chlorides be present in amounts which do not compromise the required properties of the polymer. The PPD-T has amide linkages (—CO—NH—) resulting from the chemical combination of the amine groups of the diamines and the carboxyl groups of the terephthaloyl chlorides and at least 85% of the amide linkages are attached directly to two aromatic rings.

Additives can be used with the components of the PPD-T and it has been found that up to as much as 10 percent, by weight, of other polymeric material can be blended with the PPD-T.

The PPD-T fibers of this invention have allyl groups (AL), nitrobenzyl groups (NB), or nitrostilbene groups (NS), as grafting agents, grafted to the PPD-T by replacement of the hydrogen at amide groups (—CO—N(AL/NB/NS)—). The nitrostilbene group has the advantage of being a bifunctional structure including both the allyl and the nitrobenzyl groups. The grafting reaction is performed by deprotonation and metallation of —NH groups using a reagent prepared by an interaction of potassium tert-butoxide with dimethyl sulfoxide (DMSO) to yield a polyanion structure. The metallated polyanions can then be subjected to nucleophilic substitution of AL, NB, or NS groups. The overall reaction sequences are known as the deprotonation grafting reaction of this invention.

It has been concluded that the PPD-T polymer in the fibers of this invention should be subjected to the deprotonation grafting reaction after formation or spinning of the fibers because such permits the most advantageous use of the grafted materials. However, it would be possible to make the grafted fibers of this invention by grafting the PPD-T prior to formation of the fibers.

The fibers are generally spun from an anisotropic spin dope using an air gap spinning process such as is well known and is described in U.S. Pat. Nos. 3,767,756 or 4,340,559.

Fibers are spun from an anisotropic spin dope, through an air gap, into an aqueous coagulating bath, and through an aqueous rinse and wash. The resulting fibers are so-called "never-dried" and include from 20 to 400%, by weight, water. While the fibers to be used may be partially dried, it is important that they have been newly-spun and have never been dried to less than 20 percent moisture prior to the grafting. Fibers which have been previously dried to less than 20 percent moisture have had their molecular structure irreversibly collapsed and ordered into a compact fiber. Never-dried fibers are important for use in this invention because they are more wettable, individually and in yarn bundles, by the grafting reagents and provide more porosity and increased accessibility of the grafting reagents to the —NH reaction centers.

The grafting process of this invention involves the formation of a metallated PPD-T polyanion as a precursor to the grafted polymer. Up to this time, it has been the accepted practice to conduct grafting processes such as this one in dry conditions to minimize the competitive reprotonation by water which could reduce the grafting reaction yield.

The grafting process of this invention utilizes a strong base material and it has been determined that potassium tert-butoxide is preferred because it will function in the water-containing polymer material on which the grafts are to be made. Other strong bases may be used which exhibit a Pka greater than 12 in DMSO or an equivalent aprotic solvent. Other suitable bases are sodium methoxide, potassium hydroxide, sodium amide, n-butyl lithium, tri-methyl aluminum, and lithium diisopropylamide. These materials are discussed in an article by R. R. Burch, W. Sweeny, H-W Schmidt and Y. H. Kim, Macromolecules, Vol. 23, 1065 (1990).

The grafting process of this invention is conducted by contacting never-dried PPD-T fibers with a solution of 0.0005 to 6 molar potassium tert-butoxide in a nonaqueous solvent for 0.03 second to 8 minutes to make base-activated fibers; and then contacting the base-activated fibers with a grafting solution of 0.0005 to 5 molar allyl halide, nitrobenzyl halide, or nitrostilbene halide in a nonqueous solvent for 0.03 second to 8 minutes to make grafted fibers and washing the fibers in water. The initial contact of never-dried fibers with the potassium tert-butoxide yields base-activated fibers in spite of the presence of water in the fibers. It has been determined that the use of other butoxides will not result in base-activated fibers due to the base-deactivating effect of the water. The nonaqueous solvent used in this invention is usually dimethyl sulfoxide but may, also, include up to 90 weight percent of other solvents which do not interfere or react with the base or the activated fibers. Examples of such other solvents are toluene, tetrahydrofuran, ethylbenzene, heptane, hexane, pentane, tert-butanol, 2-methyl-2-propanol, diisopropylamine, 1,4-dioxane, and the like, and combinations of those solvents.

The halide in the grafting agents to be grafted by the process of this invention is preferably chloride, bromide, or iodide. Allyl, nitrobenzyl, and nitrostilbene moieties have been found to provide improved adhesion-to-rubber characteristics while maintaining high and efficient grafting reaction kinetics.

While the grafting of this invention could be conducted on unshaped PPD-T polymer, it has been concluded that the grafting is more efficiently accomplished on the fiber form. Grafting on the fiber form provides grafted moieties on and near the fiber surface rather than deep within the fiber structure.

It is believed that the grafting process of this invention provides PPD-T fibers with a surface in which the hydrogen on 0.25 to 50, or perhaps 75% of the exposed amine sites have been replaced by the moiety grafted thereon.

The fibers of this invention, once grafted, can be washed in a nonaqueous solvent or in water, as desired.

The base-activating and the grafting are, both, very fast reactions which can be accomplished in fractions of a second or slightly more, under proper reaction conditions. The reactions are generally conducted at 15 to 50 degrees C. at atmospheric pressure. The fibers are never-dried and usually include 20 to 400, preferably 30 to 100, weight percent water. It is believed that this grafting reaction can be conducted in the presence of water in the fibers because the competitive reprotonation of the activated fiber by the surrounding water does not take place fast enough due the complexing effect of DMSO and the metallating agent, for example, a potassium crown ether structure is formed around the deprotonated amide bond and tends to protect the polyanion from being reprotonated while the grafting substitution takes place. It is also believed that the DMSO tends to displace water out of the porous never dried fiber structure.

The fibers of this invention, once grafted, are used in reinforcement of rubber materials. The qualities of a material which will yield good adhesion to another material are not completely understood and are often identified empirically. The grafted fibers of this invention have been found to have excellent adhesion to a variety of rubber materials including nitrile butadiene rubber (hydrogenated and nonhydrogenated) (NBR); ethylene-propylene-diene monomer rubber (EPDM) including such dienes as 5-ethylidene-2-norbornene(5-ethylidenebicyclo[2.2.1]hept-2-ene), dicyclopentadiene(bicyclo[2.2.1]hepta-2,5-diene), and 1,4-hexadiene; chlorosulfonyl-polyethylene (CSM); ethylene oxide and chloromethyl oxirane (ECO); hexafluoropropylene vinylidene fluoride (FPM); natural rubber (NR); styrene-butadiene rubber (SBR); and the like. The grafted fibers of this invention have been found to be particularly effective in increasing the adhesion of the fibers to NBR and EPDM.

Grafted fibers of this invention are used to reinforce rubber matrix materials by compounding the fibers with the matrix materials by methods well known in this art. For example, the fibers are worked into the rubber on a roll mill or other compounding device adapted for this purpose. The fibers are generally cut or chopped in the form of floc or staple and, in that form, are dispersed in the rubber. Fibers for rubber reinforcement are cut to lengths of a few millimeters to several centimeters.

Rubber compositions may have a variety of additives, all of which are necessary for a particular need or use. For the same reason, there may be a wide range of concentrations of the grafted fibers in reinforced rubber compositions. Generally, such compositions will have 0.5 to 15 weight percent grafted fibers, based on the weight of the rubber.

Another way to incorporate grafted fiber of this invention into a rubber is by knitting, braiding, spiraling, or weaving the grafted fiber around an extruded rubber tube which is then covered or not by a second layer of an identical or a different rubber to form a hose, a cylindrical reservoir or any shaped article which will benefit from the reinforcement by the grafted fiber.

Test Methods

For adhesion testing, as reported in the Examples set out below, the ASTM D4776-88, "Standard Test Method for Adhesion of Tire Cords and Other Reinforcing Cords to Rubber Compounds by H-Test Procedure", was used.

EXAMPLES

Example 1

Poly(p-phenylene terephthalamide) fibers were spun generally as described in U.S. Pat. No. 4,340,559, using Tray G thereof. The polymer was PPD-T having an inherent viscosity of about 6.3 dL/g. The polymer was dissolved in 100.1 percent sulfuric acid to form a dope containing 19.4 percent polymer (based on total weight of the dope). The dope was extruded through a spinning capillary 63.5 micrometers in diameter; and the spinning was conducted at a dope temperature of 71° C. directly into an air gap 0.64 cm in length and thence into a spin tube together with coagulating liquid which was an aqueous solution containing 8 percent by weight sulfuric acid maintained at 2° C. The coagulated fibers were forwarded from the coagulation bath to a water-washing stage, to a neutralization stage, and then through dewatering pins to a bath wherein they were contacted with a solution of 0.6 molar potassium tert-butoxide in dimethyl sulfoxide for about 0.5 second at a temperature of 20° C. to make base-activated fibers. At the time that the fibers were contacted with the solution of potassium tert-butoxide, they contained about 30 percent water, based on the total weight of the PPD-T in the fibers. The base-activated fibers were then rinsed in dimethyl sulfoxide to rid the fibers of excess tert-butoxide. This rinsing step was optional, but may be beneficial to avoid any excess of tert-butoxide which could interfere with the grafting efficiency by reacting with the grafting agent.

Following the base-activation step, the fibers were contacted with a grafting solution of 0.5 molar nitrobenzyl chloride grafting agent in dimethyl sulfoxide for 75 milliseconds at a temperature of 20° C. to make grafted fibers. After the grafting, the fibers were washed with water and dried for 0.5 to 2 seconds at a temperature of 180° C.

Example 2

In this example, the same procedure as in Example 1 was used except that the grafting solution was 0.5 molar allyl chloride grafting agent in dimethyl sulfoxide and the grafting reaction was conducted for 75 milliseconds at a temperature of 20° C.

Example 3

In this example, the grafted fibers from the previous examples were tested for adhesion to rubber materials. The adhesion results of these tests were compared with adhesion results of the same PPD-T fibers ungrafted with no coating and ungrafted with the "double dipped" coating of the prior art.

The "double dipping" was conducted by applying 1 percent, by weight, of an epoxy subcoat with formulation (I), and drying and curing at 210 degrees C. for a sufficient time to avoid tackiness and applying, on the subcoated fiber, 8 percent, by weight, of a resorcinol formaldehyde topcoat with formulation (II), followed by drying and curing at 190 degrees C. for about three minutes.

| Formulation (I) | Composition (% by wt) |
|---|---|
| water | 97% |
| sodium hydroxide (10% aqueous) | 0.3% |
| NER-010-A (Diglycidyl Ether of Glycerol resin from NAGASE America Corp.) | 2.2% |
| Dioctyl Sodium Sulfosuccinate, wetting agent, (75% aqueous) | 0.5% |

| Formulation (II) | composition (% by wt) |
|---|---|
| water | 48.6% |
| sodium hydroxide (1.67% aqueous) | 3.1% |
| resorcinol flakes | 1.9% |
| formaldehyde | 2.7% |
| "Gen Tac" 41% aqueous latex from General Tire & Rubber Co. | 41.8% |
| ammonium hydroxide (28% aqueous) | 1.9% |

Test materials were made and tested in accordance with aforementioned ASTM D4776 using hydrogenated nitrile butadiene rubber (HNBR) in the composition set out below.

The HNBR composition used in these tests was as follows:

| Hydrogenated Nitrile Rubber | 46% |
|---|---|
| Carbon Black | 30% |
| Silica Dioxide | 12% |
| Magnesium Oxide | 6% |
| Plasticizers | 3% |
| Stearic Acid | 1% |
| Antioxidants | 1% |
| Peroxide | 1% |

Results of the tests are reported in the table below.

TABLE

| Yarn Type | Adhesion test results (Newtons) |
|---|---|
| Untreated Yarn | 10 ± 8 |
| Base-Activated Yarn (comparison) | 30 ± 5 |
| AL Grafted Yarn | 79 ± 5 |
| NB Grafted Yarn | 89 ± 4 |
| Double-Dipped Yarn (comparison) | 76 ± 7 |

It is noted that the grafted fibers of this invention exhibited rubber adhesion which was increased over all comparisons; and that the grafting of this invention is accomplished by a process which represents a considerable advance over the double-dipping process of the prior art.

What is claimed is:

1. A fiber reinforced rubber composition comprising a rubber matrix material selected from the group consisting of nitrile butadiene rubber, ethylene-propylene-diene monomer rubber, chlorosulfonyl-polyethylene, ethylene oxide and chloromethyl oxirane, hexafluoropropylene vinylidene fluoride, natural rubber, and styrene butadiene rubber and, embedded therein, fibers of poly(p-phenylene terephthalamide) having a grafting agent selected from the group consisting of nitrobenzyl groups and nitrostilbene groups grafted thereto.

2. The fiber reinforced composition of claim 1 wherein the hydrogen on 0.25 to 50 percent of the amine sites on the poly(p-phenylene terephthalamide) has been replaced by the grafting agent grafted thereto.

3. The fiber reinforced composition of claim 1 wherein the hydrogen on 0.25 to 75 percent of the amine sites on the poly(p-phenylene terephthalamide) at the surface of the fibers has been replaced by the grafting agent grafted thereto.

4. A process for making grafted poly(p-phenylene terephthalamide) fibers comprising the steps of:
   a) spinning a solution of poly(p-phenylene terephthalamide) into an aqueous coagulating bath to make coagulated fibers having 20% to 400% water, based on the weight of poly(p-phenylene terephthalamide) material in the fibers;
   b) contacting the coagulated fibers, along with the water therein, with a base solution of 0.0005 to 6 molar of a base which exhibits a Pka greater than 12 in dimethylsulfoxide for 0.030 second to 8 minutes to make base-activated fibers;
   c) contacting the base-activated fibers with a grafting solution of 0.0005 to 5 molar of a grafting agent selected from the group consisting of allyl halide, nitrobenzyl halide, and nitrostilbene halide for 0.030 second to 8 minutes to make grafted fibers.

5. The process of claim 4 wherein step b) is followed by quenching the base-activated fibers with a nonaqueous liquid to eliminate excess base before step c).

6. The process of claim 4 wherein the base is potassium tert-butoxide.

7. The process of claim 4 wherein there is an additional step of, d) washing the grafted fibers with water.

8. The process of claim 4 wherein the solvent for the base solution of step b) and the grafting agent solution of step c) is dimethylsulfoxide.

9. The process of claim 5 wherein the nonaqueous liquid is dimethylsulfoxide.

* * * * *